US008850449B2

(12) United States Patent
Hiltunen et al.

(10) Patent No.: US 8,850,449 B2

(45) Date of Patent: Sep. 30, 2014

(54) METHOD AND APPARATUS FOR PROVIDING RESOURCE ALLOCATION POLICY

(75) Inventors: Matti Hiltunen, Chatham, NJ (US); Kaustubh Joshi, Scotch Plains, NJ (US); Gueyoung Jung, Atlanta, GA (US); Calton Pu, Atlanta, GA (US); Richard Schlichting, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1430 days.

(21) Appl. No.: 12/340,471

(22) Filed: Dec. 19, 2008

(65) Prior Publication Data

US 2010/0162257 A1 Jun. 24, 2010

(51) Int. Cl.

*G06F 9/455* (2006.01)
*G06F 9/46* (2006.01)
*G06F 9/50* (2006.01)

(52) U.S. Cl.

CPC ........................................ *G06F 9/50* (2013.01)
USPC .......................................................... 718/108

(58) Field of Classification Search

None
See application file for complete search history.

(56) References Cited

U.S. PATENT DOCUMENTS

| | | | | |
|---|---|---|---|---|
| 2004/0267395 | A1 * | 12/2004 | Discenzo et al. | 700/99 |
| 2005/0228852 | A1 * | 10/2005 | Santos et al. | 709/200 |
| 2005/0257199 | A1 * | 11/2005 | Johansson et al. | 717/126 |
| 2006/0218285 | A1 * | 9/2006 | Talwar et al. | 709/227 |

* cited by examiner

*Primary Examiner* — Corey S Faherty

(57) ABSTRACT

A method and apparatus for providing a resource allocation policy in a network are disclosed. For example, the method constructs a queuing model for each application. The method defines a utility function for each application and for each transaction type of each application, and defines an overall utility in a system. The method performs an optimization to identify an optimal configuration that maximizes the overall utility for a given workload, and determines one or more adaptation policies for configuring the system in accordance with the optimal configuration.

20 Claims, 5 Drawing Sheets

METHOD AND APPARATUS FOR PROVIDING RESOURCE ALLOCATION POLICY

The present invention relates generally to communication networks and, more particularly, to a method and apparatus for providing resource allocation policy in networks, e.g., Internet Protocol (IP) networks, Voice over Internet Protocol (VoIP) networks, Virtual Private Networks (VPN), and the like.

BACKGROUND OF THE INVENTION

A network service provider may enable its customers to share application resources. For example, a network service provider may provide on-demand computing, virtualization of applications, and the like to take advantage of pooled resources. The achievability of perceived benefits, e.g., reduced cost and increased application utilization, depends on allocating resources in an optimal manner.

Service provider personnel may manage allocation of resources manually. However, human reaction time may be too slow and the service provider personnel may not be able to consider all factors when making resource allocation decisions. Alternatively, a management system may be implemented to automate a rule based system. The rules may be based on experiences of systems administrators. For example, a rule may say "if condition X is true, then perform action Y." However, the rules may not take the system to an optimal configuration for a particular workload condition. The act of creating effective rule sets based on human knowledge and experience is challenging. Human beings are not able to quickly consider all factors for large networks.

SUMMARY OF THE INVENTION

In one embodiment, the present invention discloses a method and apparatus for providing a resource allocation policy in a network. For example, the method constructs a queuing model for each application. The method defines a utility function for each application and for each transaction type of each application, and defines an overall utility in a system. The method performs an optimization to identify an optimal configuration that maximizes the overall utility for a given workload, and determines one or more adaptation policies for configuring the system in accordance with the optimal configuration.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing resource allocation policy in networks. Although the present invention is discussed below in the context of Internet Protocol (IP) networks, the present invention is not so limited. Namely, the present invention can be applied for other types of packet networks.

Figure 1:
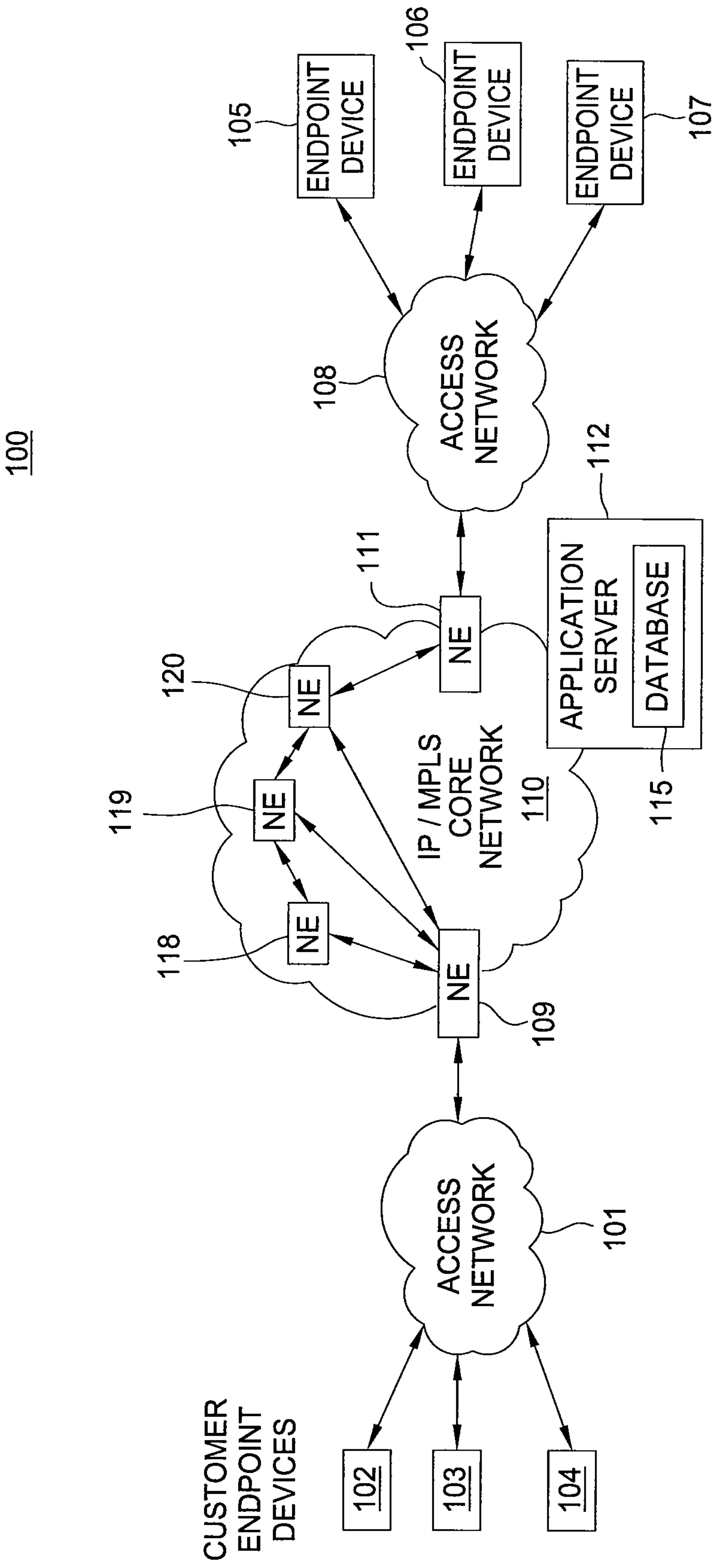
FIG. 1 illustrates an illustrative network related to the present invention.

FIG. 1 is a block diagram depicting an exemplary packet network 100 related to the current invention. Exemplary packet networks include Internet protocol (IP) networks, Ethernet networks, and the like. An IP network is broadly defined as a network that uses Internet Protocol such as IPv4 or IPv6 and the like, to exchange data packets.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), a 3$^{rd}$ party network, and the like. The access networks 101 and 108 may be either directly connected to NEs 109 and 111 of the IP/MPLS core network 110, or indirectly through another network.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements and so on are depicted in FIG. 1, the communication network 100 may be expanded by including additional endpoint devices, access networks, network elements, and/or application servers, without altering the present invention.

The above IP network is described to provide an illustrative environment in which packets for voice and data services are transmitted on networks. A network service provider may manually allocate resources in a network to be shared. For example, the service provider may simply use the experience of the systems administrators to allocate the network resources. However, such approach is not able to configure the various resources optimally for a particular workload condition in a dynamic manner.

If the network resources are shared by multiple multi-tier applications, several factors (e.g., the amount of available resources, Service Level Agreements (SLAs) between customers and the service provider, the queuing model for each type of application, etc.) will affect the workload. The service provider may perform a pre-deployment resource planning to ensure that the planned resources are adequate to satisfy the SLA requirements. The resulting plan is only a "point solution" in the sense that it specifies a configuration for the system considering the workload only at a single point in the parametric space, typically the mean or peak workload. However, the resource allocations may need to be modified over time as the workload changes. In addition, the available resources may change due to maintenance activities, network failures, etc. For example, in FIG. 1, maintenance activity may affect the amount of routing resources in router 118. A reconfiguration may then be needed to utilize routing resources in routers 119 and 120 in a different manner.

The service provider may wish to develop adaptation policies that are used to map changes in workload and/or resources to changes in configuration. However, the workload in a large network may change frequently. Thus, considering all factors for large networks and performing the decisions via a manual process before further changes occur in the workload, is very difficult. The allocation policies that enable reaching an optimal configuration need to consider the multiple factors, to enable selecting the best configurations for a given workload, and to enable making configuration changes in a timely manner.

In one embodiment, the current method provides one or more allocation policies for allocating resources dynamically. The method generates the one or more policies using an off-line approach. The method first generates a queuing model for each application. For ease of understanding, the usage of the queuing model will first be provided. The types of queuing models appropriate for the current application are provided below.

A process for performing optimization may invoke a solver for the queuing model with different configurations of resources for a given workload. For example, for each instance of an application, the method may determine an expected response time and utilization for each transaction type. The different configurations also take into account other requirements, e.g., SLAs. The process for performing optimization then identifies the best configuration for the workload while taking into account other requirements, e.g., SLAs. The method may then provide a decision tree that can be linearized into a set of rules. The set of rules may be adapted by an on-line network resources management system.

For example, consider a system consisting of a fixed pool of computing resources R (e.g., servers, routers, switches and the like), and a set of multi-tier applications A (e.g., software applications) executing on the fixed pool of computing resources. Each application may be implemented by a set of tiers of components, some of which may be replicated to increase throughput. An application may consist of: a web server tier (e.g., Apache), an application server tier (e.g. Tomcat), and a database tier (e.g., My Structured Query Language), etc. Each application may support multiple transaction types. A workload for an application may change during an interval when a set of policies are in effect (e.g., during runtime). Each application and/or each transaction type may have a service level agreement that specifies response times and/or reward/penalty for meeting/missing the response time. The share of physical resources for an instance of a component of an application may then be determined based on a variety of factors. In other words, the method reconfigures applications A on the resources R, as the workloads of the applications change, such that the overall system is optimized. The method may then determine the number of replicas for each component of an application. The method may also determine the placement and share of physical resources, for each instance of a component of an application. A system configuration C may then specify this information for all applications.

Specifically, for each application, the method constructs a queuing model that, given the application's configuration and workload, produces the expected mean response time (for each transaction type) and utilization for each component instance. Given the queuing models for all the individual applications, the method can calculate the system reward for any system configuration and any workload. The models are evaluated before system deployment with different configurations and workloads as input. The resulting policies may then be integrated with existing rule-based management systems. Furthermore, since policy rules are human readable, they can be inspected and checked by system administrators. The decoupling of policy generation from runtime policy evaluation also makes it possible to update policy generation algorithms and policy engines, and even policy verification tools, without affecting the other parts of the system. Since the models are evaluated before the system execution (for numerous configurations), the potentially considerable model execution and optimization time is out of the critical path at runtime.

Figure 2:
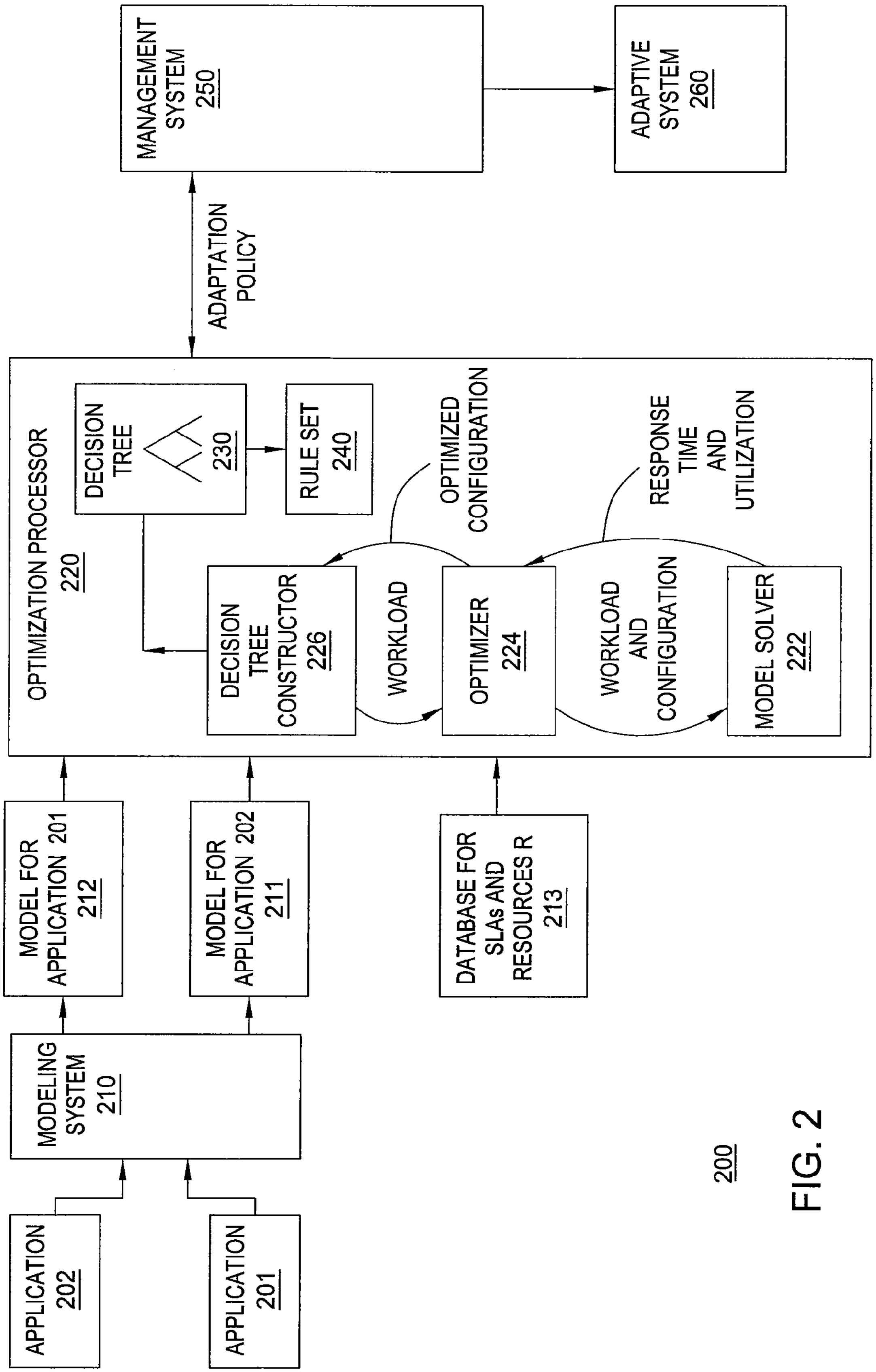
FIG. 2 illustrates an illustrative network with the current invention for providing resource allocation policy.

FIG. 2 illustrates an illustrative system 200 for providing resource allocation policy. In one embodiment, the system 200 comprises a modeling system 210 in communication with an optimization processor 220. In one embodiment, the optimization processor 220 comprises a model solver 222, an optimizer 224 and a decision tree constructor 226. The optimization processor 220 obtains information regarding resources and SLAs from a database 213. The optimization processor 220 is also in communication with a management system 250. The management system 250 is responsible for managing an adaptive system 260.

In one embodiment, the modeling system 210 develops queuing models 211 and 212 for applications 201 and 202, respectively. The optimization processor 220 then uses information obtained from the database 213, along with the models 211 and 212 to construct a decision tree 230 and a rule set 240.

In one embodiment, the decision tree constructor 226 chooses the points of workload to evaluate. The optimizer 224 searches for the best (or good enough) configuration for this workload by invoking the model solver 222 with different configurations. The decision tree constructor 226 then constructs the decision tree 230 that may be linearized into a set of rules 240. The linearization translates the content of the decision tree to one or more if-then type of statements. The optimization processor 220 then outputs the rule set 240 to the management system 250. The set of rules 240 is then used at runtime by the rule-based management system 250 to manage the adaptive system 260 having a plurality of resources to be shared. For example, the process of rule generation can be accomplished by generating a set of randomly chosen workload points and evaluating the optimal configurations at each of the workload points and then using a standard decision tree learning algorithm to construct the decision tree. In order to clearly understand the current invention, the algorithm for generating an optimal configuration is first mathematically defined below.

Let R be a set of computing resources and A be a set of multi-tier applications. For each application $a \in A$, let $N_a$, be the set of its constituent node types (e.g. web server, database, etc.). For each node type $n \in N_a$, let reps (n) be a set of allowed replication levels. Choosing a replication level for each type results in a set $N_a^k$ of actual nodes in a system. For example, a web application consisting of a Tomcat application server with up to 3 replicas, and an unreplicated My Structured Query Language (MySQL) database has reps(tomcat)={1, 2, 3}, and reps(mysql)={1}. If the Tomcat server is replicated twice in a particular configuration, then the set of nodes $N_a^k$={$tomcat_1$,$tomcat_2$,$mysql_1$}.

Each application a may support multiple transaction types $T_a=\{t_a^1, \ldots, t_a^{|T_a|}\}$. For example, Rice University Bidding System (RUBiS)—a Java 2 platform Enterprise Edition (J2EE) based action system, may have transactions for login, profile, browsing, searching, buying, and selling. The workload for the application may then be characterized by the set of request rates for its transactions, or $w_a=\{w_a^t|t \in T_a\}$, and the workload for the entire system by $W=\{w_a|a \in A\}$.

In one embodiment, each transaction $t_a$ may be characterized by a directed acyclic transaction graph that defines how the transaction uses the application components. The vertices of graph may represent the node types, and the directed edges may represent function calls made by a source node type to a destination. Each edge may be labeled by the mean number of calls made during the course of a single transaction.

Figure 3:
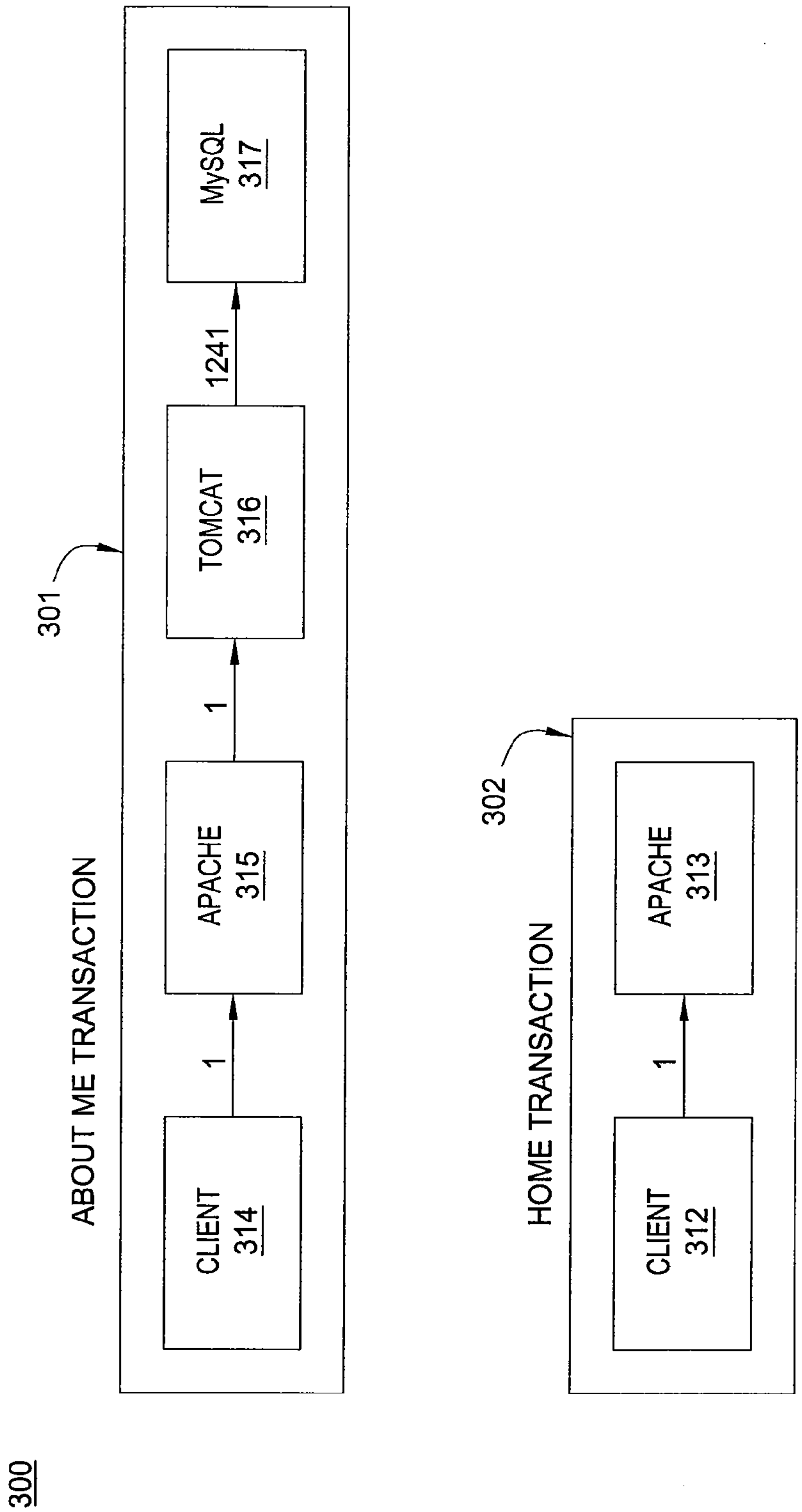
FIG. 3 illustrates example transactions in Rice University Bidding System (RUBiS)

FIG. 3 illustrates example transactions 300 in RUBiS. While a Home transaction 302 involves only a call from the client 312 to an Apache server 313, an AboutMe transaction 301 from the client 314 to the Apache server 315 makes a single call to the Tomcat server 316, which in turn makes an average of 1241 calls to the database server 317.

For each application, the method defines a utility function. The utility function may be based on SLAs and may use one or more metrics such as response time, bandwidth, throughput, etc. The statistics on each of the metrics may also be defined. For example, for a response time, the statistics may be mean response time, $90^{th}$ percentile response time, etc.

For each application a and for each of its transaction type t, an SLA specifies a target response time $TRT_a^t$, a reward $R_a^t$ for meeting the target, and a penalty $P_a^t$ for missing it. Then, if $RT_a^t$ is the actual measured response time, then the utility for application a and transaction t may be defined as $U_a^t=w_a^t R_a^t(TRT_a^t-R_a^t)$ for $TRT_a^t \geq RT_a^t$, and $U_a^t=w_a^t P_a^t(TRT_a^t-RT_a^t)$ otherwise. The overall utility is the sum across all transactions and applications and is denoted by U.

In one embodiment, the method may use different rewards for different transactions allowing for differentiation based on transaction importance. For example, the AboutMe and Home transactions of FIG. 3 may use different rewards.

In one embodiment, the utility may be any other function that is monotonically non-increasing with increasing response time. For example, another function that decreases with increasing response time may be used.

In one embodiment, the utility function may apply the reward/penalty on a per request basis. If the utility function applies the reward/penalty on a per request basis, the method may also need to model response time distributions. For example, response times may be normally distributed, uniformly distributed, etc.

The method then determines adaptation policies with a goal of configuring the system such that, for a given workload W, the utility U of the entire system is maximized. The maximization is performed to identify the configuration that maximizes the above utility, and to enable selection of replication levels, placement of components, and allocation of CPUs associated with the optimal configuration. Specifically, the maximization is carried out over the space of all possible system configurations C, where each $c \in C$ specifies: (1) the replication level c.rep (n) of each node n of each application a from the set reps(n), (2) the assignment of each replica $n_k \in N_a^k$ to a physical resource $c.r(n_k)$, and (3) the maximum cap $c.cap(n_k) \in [0,1]$ of the resource each replica is allowed to use with the constraint that the sum of the fractional allocations across all nodes of all applications is at most one for each resource.

In one embodiment, the method uses resources that are of one or more types. In another embodiment, the method uses capacity of identical CPUs, as the resources type. Note that, even for the single resource type, the parameter space contains both discrete and continuous variables. The space generated by the discrete variables itself is large even for small applications, and the goal function (i.e. the utility) is a function of mean response time which is a non-linear function of the optimization parameters. In order to minimize CPU intensive computations, the method is described below using capacity of identical CPUs as the resource type.

The current method then performs the optimization by first splitting the optimization problem into two problems: selection of application configuration and determination of the optimal component placement for a given application configuration. The selection of application configuration has a regular parameter space consisting of component replication level and CPU capacity allocation. The determination of the optimal component placement for a given application configuration is more irregular. For example, for each candidate configuration generated in the configuration optimization, the component placement optimization may act as an accept-reject mechanism. If the optimal placement can fit the required components into the available resources, then the application configuration may be accepted. Otherwise, it may be rejected.

In one embodiment, the method provides an optimization algorithm for selection of the application configuration that is a discrete gradient-based search algorithm. The optimization algorithm relies on the following observations: for any application and transaction, the utility function U is monotonically decreasing with increasing response time, the response time is monotonically (but not necessarily strictly) increasing with a reduction in the number of replicas of a component, and the response time is monotonically increasing with a reduction in the resource fraction allocated to the replicas of a component. Hence, if one starts off with the highest allowed replication level and a resource fraction of 1.0 for each component, the utility function would be the highest.

The algorithm may begin its search from a configuration in which all the application models are decoupled and may be solved independently. For example, the algorithm may begin with a configuration where each node in the system is maximally replicated and assigned an entire CPU of its own irrespective of actual CPU availability. The model solver may then be invoked for each application to estimate the response time and actual CPU utilization $\rho(n_k)$ of each node. That is, the method determines how much of a resource is truly needed by each replica by solving the queuing model assuming full replication and infinite resource availability, and computing the utilization at each replica.

A standard bin-packing algorithm may then be invoked to attempt placing the nodes on the available machines using the CPU utilizations as the volume of each node. The bin-packing approximation algorithm is executed using these computed utilizations, to determine if the replicas can be "packed" into the set of available resources so that the sum of the utilizations at each resource is less than or equal to one.

If a viable bin-packing can be found, the algorithm terminates. If the algorithm is unsuccessful, various strategies may be used to choose which replication level (or CPU fraction) is to be reduced. In one embodiment, the current method uses an algorithm with a strategy that is based on gradient-descent search of choosing the configuration change that yields the maximum reduction in overall CPU utilization for a unit reduction in utility. Specifically, the algorithm re-evaluates all possible single-change degradations of the current configuration by either reducing the replication level of a single node type in some application to the next lower level, or by reducing the allowed CPU capacity for a single node in some application by a step of Δr. The method then performs reevaluation for the affected application. The algorithm then picks the degraded configuration that provides the maximum reduction in overall CPU utilization for a unit reduction in utility, or gradient, which is defined as:

$$\Delta\rho = \frac{\sum_{a \in A, n_k \in N_a^k} \rho_{new}(n_k) - \rho(n_k)}{U_{new} - U}.$$

The process is repeated until a viable bin-packing is found. In one embodiment, the step of Δr may have a default value, e.g. 5%.

The above technique never gets stuck in local minima because the resource fraction allocated to replicas can always be reduced down to zero to ensure that the bin-packing succeeds. Note that the problem of bin-packing has been studied, and is one of the few NP-Complete problems for which polynomial time approximation algorithms that can approximate the optimal solution to within any fixed percentage are known. In one embodiment, the current method uses the n log n time first-fit decreasing algorithm that ensures results that are (asymptotically) within 22.22% of the optimal solution.

The above optimization for finding an optimal configuration relies on modeling of the various applications. Specifically, the optimization process uses the output of the modeling system (i.e. the queuing modeling system for the applications), information about the resources and SLAs to perform the optimization. Hence, selecting the appropriate queuing model is important for finding optimal configurations.

In one embodiment, the current method uses Layered Queuing Networks (LQNs) modeling tool that has rich support for multiple classes and servers, in addition to support of these synchronous interactions. The parameters for the LQN model are computed in an off-line training phase. One or more parameters may be defined to represent: the latency introduced by a network, delay due to disk input/output, processing performed by a software component (e.g. M/M/n queuing where n is the number of maximum software threads each component if configured for), delay due to interaction induced by the virtual machine environment (e.g. Xen open source environment for virtualization), work load generation rate per transaction type (e.g. Poisson processes for each transaction type), etc.

In one embodiment, the values for various parameters are computed for each application with one replica per component subjected to a workload that consists of only a single transaction at a time. The measurements may be repeated to compute various statistics on the parameters, e.g. mean, $90^{th}$ percentile, and so on. The process of modeling may be repeated in two environments: (1) virtualized environment in which each component executes in its own virtual machine and (2) native environment in which each component is given its own native operating system without virtualization.

Rather than creating a single model that includes all the applications sharing the available physical resources, the above approach creates a separate model for each application. This allows the models to be regenerated and solved incrementally on an application-by-application basis when the replication level of a particular server, or the CPU fraction assigned to a replica, is changed during the optimization process.

Figure 4:
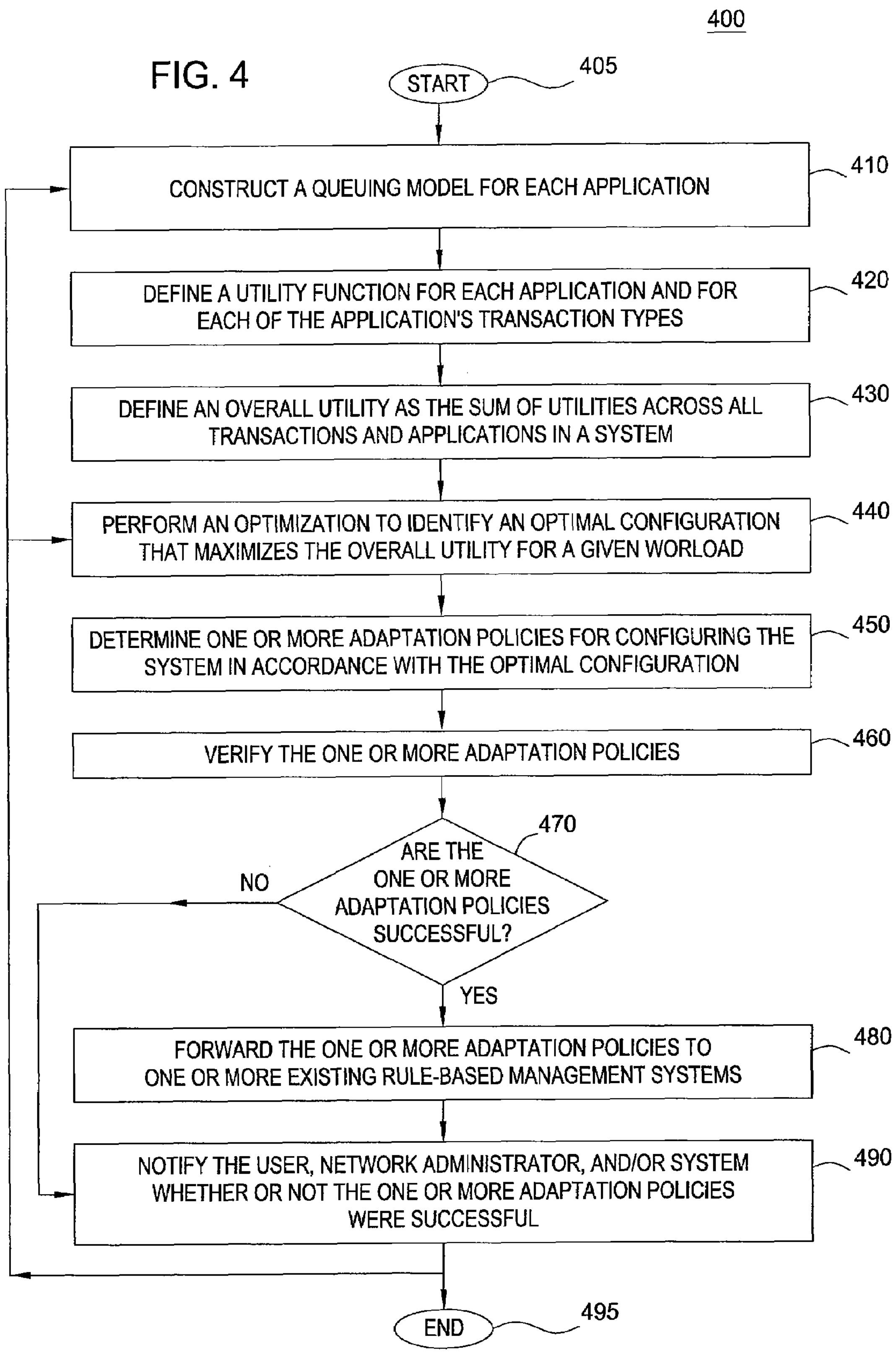
FIG. 4 illustrates a flowchart of a method for providing resource allocation policy.

FIG. 4 illustrates a flowchart of a method 400 for providing a resource allocation policy. For example, method 400 may be implemented by an application server 112. Method 400 starts in step 405 and proceeds to step 410.

In step 410, method 400 constructs a queuing model for each application, wherein the queuing model produces an expected mean response time and utilization for each component instance of the application, given the application's configuration and workload.

In step 420, method 400 defines a utility function for each application and for each of the application's transaction types. For example, a web application may have login, browsing, etc. as transaction types. The method then defines a utility function for each application and each of its transaction types.

In step 430, method 400 defines an overall utility as the sum of utilities across all transactions and applications in a system or network. For example, given the queuing models for all the individual applications, the method may define an overall utility function for a system as the system's reward function defined as the sum of utilities across all transactions and applications in the system, for any system configuration and any workload.

In step 440, method 400 performs an optimization to identify an optimal configuration that maximizes the overall utility for a given workload. For example, for a workload level in a range of 0-1000 users, configuration A might be optimal, while for a workload level in a range of 10,000 users, configuration B might be optimal, and so on. In one embodiment, the optimal configurations may be provided for a preselected workload levels. In another embodiment, the workload levels to be evaluated may be provided by a user.

In step 450, method 400 determines one or more adaptation policies for configuring the system in accordance with the optimal configuration. For example, for a given workload level, one or more adaptation policies may be developed to reach the optimal configuration. For example, if the workload level is in excess of the available capacity, an adaptation policy may reduce resources associated with blogging transactions to be reduced to minimal levels such that other applications may use the resources.

In optional step 460, method 400 optionally verifies the one or more adaptation policies. For example, the adaptation policies may be verified to minimize unintended consequences. In one embodiment, the rules may be checked by system administrators prior to being incorporated into existing rule based systems. In another embodiment, the verification can be automated by verifying the one or more adaptation policies against verification rules that were previously defined by the system administrators.

In step 470, method 400 optionally determines if the one or more adaptation policies are successful in view of the verification. If the adaptation policies are successful, the method proceeds to step 480. Otherwise, the method proceeds to step 490.

In step 480, method 400 forwards or provides the one or more adaptation policies to one or more existing rule-based management systems. For example, the adaptation policies may be used by existing rule-based management systems that currently manage a network using such adaptation policies.

In optional step 490, the method notifies the user, network administrator, and/or system whether or not the implementation of one or more adaptation policies was successful. The method then ends in step 495 or return to step 410 and/or step 440 to continue constructing queuing models and performing optimizations.

It should be noted that although not specifically specified, one or more steps of method 400 may include a storing, displaying and/or outputting step as required for a particular application. In other words, any data, records, fields, and/or intermediate results discussed in the method 400 can be stored, displayed and/or outputted to another device as required for a particular application. Furthermore, steps or blocks in FIG. 4 that recite a determining operation, or involve a decision, do not necessarily require that both branches of the determining operation be practiced. In other words, one of the branches of the determining operation can be deemed as an optional step.

Figure 5:
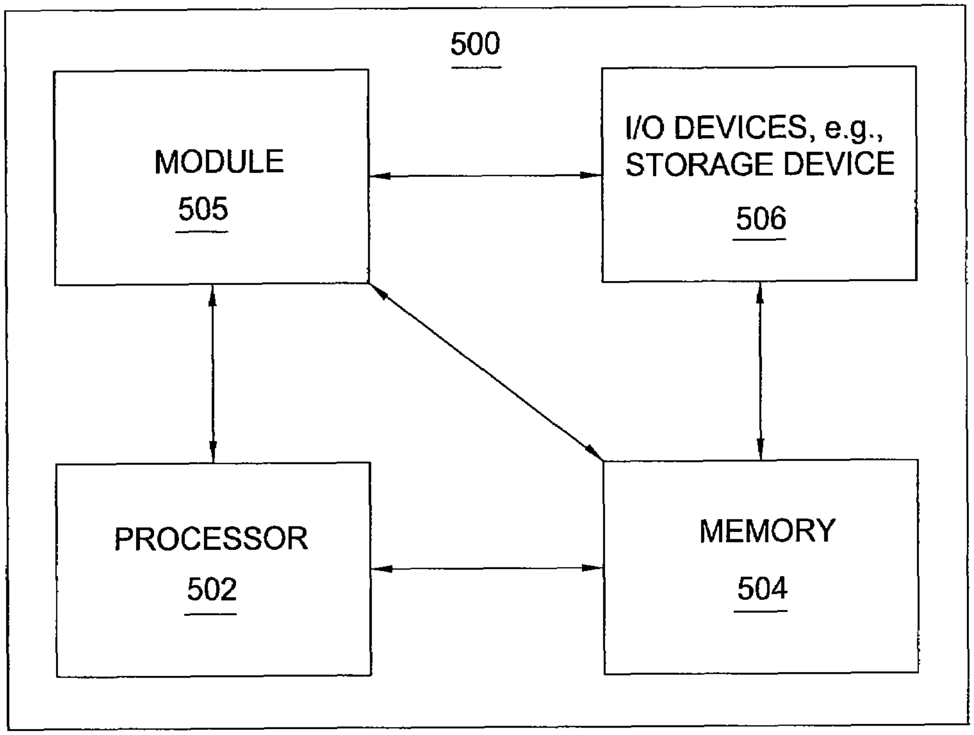
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing a resource allocation policy, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing a resource allocation policy can be loaded into memory 504 and executed by processor 502 to implement the functions as discussed above. As such, the present method 505 for providing a resource allocation policy (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a resource allocation policy, comprising:

constructing a queuing model for each application;

defining a utility function for each application and for each transaction type of each application, wherein the transaction type is associated with a type of transaction performed by a corresponding application, wherein the transaction type comprises at least one of: a blogging transaction, a profiling transaction, a browsing transaction, a logging-in transaction, a searching transaction, a buying transaction, and a selling transaction;

defining an overall utility in a system in accordance with the queuing model for each application, the utility function for each application and for each transaction type of each application;

performing an optimization to identify an optimal configuration that maximizes the overall utility for a given workload; and determining an adaptation policy for configuring the system in accordance with the optimal configuration.

2. The method of claim 1, further comprising:

forward the adaptation policy to a rule-based management system.

3. The method of claim 1, further comprising:

verifying the adaptation policy.

4. The method of claim 1, further comprising:

notifying a user, a network administrator, or a system whether the adaptation policy is successfully implemented.

5. The method of claim 1, wherein the queuing model is a layered queuing network model.

6. The method of claim 5, wherein a parameter for the layered queuing network model is computed in an off-line training phase.

7. The method of claim 6, wherein the parameter is defined to represent: a latency introduced by a network, a delay due to a disk input/output, a processing performed by a software component, a delay due to an interaction induced by a virtual machine environment, or a work load generation rate.

8. The method of claim 7, wherein the work load generation rate is a per transaction type.

9. The method of claim 1, wherein the performing the optimization comprises:

selecting an application configuration; and determining an optimal component placement for the application configuration that is selected.

10. The method of claim 9, wherein the selecting the application configuration uses an optimization algorithm that is a discrete gradient-based search algorithm.

11. The method of claim 9, wherein the determining the optimal component placement is performed using a bin-packing algorithm.

12. The method of claim 11, wherein the bin-packing algorithm uses an algorithm based on a gradient-descent search for choosing a configuration change that yields a maximum reduction in overall central processing unit utilization for a unit reduction in utility.

13. The method of claim 11, wherein the bin-packing algorithm uses a central processing unit utilization as a volume for each node.

14. The method of claim 1, wherein the adaptation policy enables a selection of a replication level.

15. A non-transitory computer-readable medium having stored thereon a plurality of instructions, the plurality of instructions including instructions which, when executed by a processor, cause the processor to perform operations for providing a resource allocation policy, the operations comprising:

constructing a queuing model for each application;

defining a utility function for each application and for each transaction type of each application, wherein the transaction type is associated with a type of transaction performed by a corresponding application, wherein the transaction type comprises at least one of: a blogging transaction, a profiling transaction, a browsing transaction, a logging-in transaction, a searching transaction, a buying transaction, and a selling transaction;

defining an overall utility in a system in accordance with the queuing model for each application, the utility function for each application and for each transaction type of each application;

performing an optimization to identify an optimal configuration that maximizes the overall utility for a given workload; and determining an adaptation policy for configuring the system in accordance with the optimal configuration.

16. The non-transitory computer-readable medium of claim 15, further comprising:

forward the adaptation policy to a rule-based management system.

17. The non-transitory computer-readable medium of claim 15, further comprising:

verifying the adaptation policy.

18. The non-transitory computer-readable medium of claim 15, wherein the queuing model is a layered queuing network model.

19. The non-transitory computer-readable medium of claim 18, wherein the parameter for the layered queuing network model is computed in an off-line training phase.

20. An apparatus for providing a resource allocation policy, comprising:

a processor; and a computer readable medium in communication with the processor, the computer readable medium has stored thereon instructions that, when executed by the processor, cause the processor to perform operations, the operations comprising:

constructing a queuing model for each application;

defining a utility function for each application and for each transaction type of each application, wherein each transaction type is associated with a type of transaction performed by a corresponding application, wherein the transaction type comprises at least one of: a blogging transaction, a profiling transaction, a browsing transaction, a logging-in transaction, a searching transaction, a buying transaction, and a selling transaction;

defining an overall utility in a system in accordance with the queuing model for each application, the utility function for each application and for each transaction type of each application;

performing an optimization to identify an optimal configuration that maximizes the overall utility for a given workload; and determining an adaptation policy for configuring the system in accordance with the optimal configuration.

* * * * *